United States Patent [19]
Macor

[11] Patent Number: 5,841,849
[45] Date of Patent: Nov. 24, 1998

[54] USER INTERFACE FOR PERSONAL TELECOMMUNICATION DEVICES

[75] Inventor: James Joseph Macor, Jackson, N.J.

[73] Assignee: Lucent Technologies Inc., Murray Hill, N.J.

[21] Appl. No.: 739,668

[22] Filed: Oct. 31, 1996

[51] Int. Cl.⁶ .............................. H04M 1/56; H04M 1/00; H04M 9/00
[52] U.S. Cl. ........................ 379/142; 379/426; 379/428; 379/433; 379/434; 379/93.17; 379/93.23
[58] Field of Search ..................... 379/142, 428, 379/433, 434, 426, 429; 455/89, 91, 92, 93, 100, 347, 351, 550, 566, 569, 575, 556, 90, 525; D10/30–39; D14/113, 119, 140, 142, 138, 148

[56] References Cited

U.S. PATENT DOCUMENTS

| | | | |
|---|---|---|---|
| D. 303,503 | 9/1989 | Kai | D10/31 |
| D. 332,783 | 1/1993 | Krakower et al. | D14/106 |
| D. 339,299 | 9/1993 | Kawashima | D10/38 |
| D. 355,611 | 2/1995 | Hanagata | D10/30 |
| D. 369,598 | 5/1996 | Nagele et al. | D14/138 |
| D. 378,686 | 4/1997 | Proctor et al. | D14/100 |
| D. 379,983 | 6/1997 | Shindou | D14/138 |
| 4,720,781 | 1/1988 | Crossland et al. | 364/200 |
| 4,847,818 | 7/1989 | Olsen | 455/90 |
| 5,436,954 | 7/1995 | Nishiyama et al. | 379/428 |
| 5,598,469 | 1/1997 | Preker | 379/433 |
| 5,677,949 | 10/1997 | Macor | 379/354 |

*Primary Examiner*—Curtis A. Kuntz
*Assistant Examiner*—Rexford N. Barnie
*Attorney, Agent, or Firm*—Claude R. Narcisse

[57] ABSTRACT

An ergonomic personal telecommunication device that is of optimum size for user operation and manipulation allowing the user to operate the device as a telephony device or an electronic messaging device with one finger by using virtual function keys and buttons appearing at a function display.

25 Claims, 6 Drawing Sheets

5,841,849

USER INTERFACE FOR PERSONAL TELECOMMUNICATION DEVICES

CROSS REFERENCES

This application is related to a commonly assigned application entitled "Telephone with Minimal Switches for Dialing" filed on Dec. 12, 1994 with Ser. No. 08/362,054 and a commonly assigned and concurrently filed application entitled "User Interface for Portable Telecommunication Devices" filed on Oct. 31, 1996 with Ser. No. 08/739,670.

BACKGROUND OF THE INVENTION

1. Field of the Invention

This invention relates to personal telecommunication devices such as portable cellular phones or portable electronic messaging devices or combinations thereof and in particular to the physical design of such devices.

2. Description of Related Art

As telephones and other telecommunication devices have become more portable, there has arisen a design conflict between the physical size for these devices and the trend for smaller devices due to the advances in integrated circuit technology. From an ergonomic viewpoint, it is only practical to reduce the size of these devices including the size of the traditional twelve button dialing keypad, typically found on these devices, and other functional interface buttons to a size that still allows for speedy, effective and accurate use of these devices. From a technological viewpoint, however, as integrated circuitry and other electronic components are continually decreasing in physical size, these portable communication devices can be designed and manufactured at relatively very small sizes. The technology has reached a point where it is no longer ergonomically desirable to continue to decrease the size of the personal telecommunication devices because it becomes difficult and almost impossible for users to operate these devices. For example, the dialing keypad buttons become so small that it becomes difficult for a user to touch one key without accidentally touching another key or the entire device becomes so small that it becomes difficult for a user to use the device as a telephone because the distance between the device's microphone and speaker is not sufficiently long to extend from the user's ear to the user's mouth.

SUMMARY OF THE INVENTION

This invention overcomes the heretofore discussed limitations by providing an ergonomic user interface for a personal communication device comprising a first base member having an inner surface, an outer surface, a first end and a first hinged end opposite the first end, a second base member having an inner surface, an outer surface, a second end and a second hinged opposite the second end. A first display is mounted on the inner surface of the first base member for displaying information. A second display is mounted on the inner surface of the second base member for displaying information. A microphone is supported by one of the base members. A speaker is also supported by one of the base members. A hinge connects the first hinged end to the second hinged end. A manipulatable member supported by one of the base members is functionally connected to at least one of the displays so that when this member is manipulated information displayed on at least one of the displays is altered.

Another embodiment of the present invention provides for a device which can be worn by the user. The device comprises a base member having an inner surface, an outer surface and two opposite ends. Attachment means for affixing the device to the user are connected to the opposite ends of the base member. A speaker and a microphone are mounted on the attachment means. A first display is mounted on the inner surface of the base member. A door is hingedly connected to the base member and has a front surface and a back surface with a second display mounted on the front surface. A fastener detachably secures the door to the base member when the door is in a closed position. A manipulatable member is supported by the base member and is functionally connected to at least one of the first and second displays to change information displayed on at least one of the first and second displays in response to a manipulation of the manipulatable member.

BRIEF DESCRIPTION OF THE DRAWINGS

FIG. 11 depicts the wearable device in the "program" mode and.

DETAILED DESCRIPTION

Figure 1:
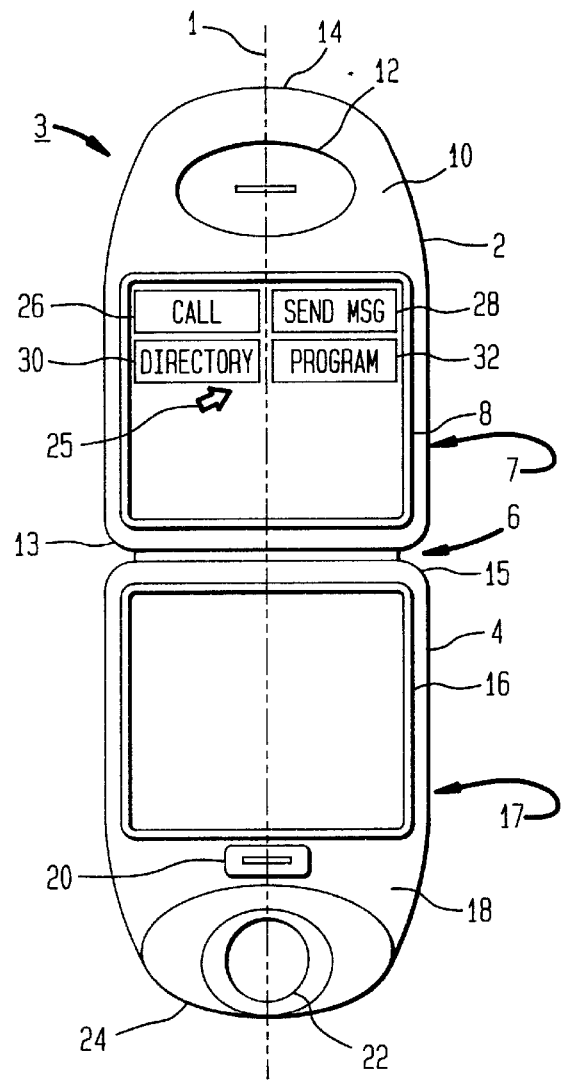
FIG. 1 depicts the present invention as a portable device in the idle mode.

FIG. 1 shows device 3 (hereinafter "the portable device"), the first embodiment of the present invention and having function display 8 mounted on inner surface 10 of first base member 2 for displaying data menus and virtual function keys. Formulated information display 16 is mounted on inner surface 18 of second base member 4 which is hingedly connected to first base member 2 with hinge 6. That is, hinge 6 is connected to first base member 2 at first hinged end 13 and to base member 4 at second hinged end 15. Manipulatable member 22 is supported by second base member 4 and allows the user to completely operate device 3 by formulating information from the display menu and activating the virtual function keys to cause said information to be displayed on formulated information display 16. Microphone 20 is supported by base member 4. Speaker 12 is supported by first base member 2 and positioned substantially near end 14 of first base member 2. The manipulatable member is depressable trackball 22 which is postioned substantially near end 24 of second base member 4. Depressable trackball 22 maneuvers location indicator 25 displayed on function display 8 and when depressed allows the user to activate a selected virtual function key or button being displayed on the function display. When base members 2 and 4 are oriented so that they are coplanar, as shown in FIG. 1, the distance between first end 14 and second end 24 is optimized by the arrangement and individual sizes of speaker 12, function display 8, information display 16, microphone 20 and depressable trackball 22. Longitudinal axis 1 extends from end 14 to end 24. Speaker 12, function display 8, formulated information display 16, microphone 20 and depressable trackball 22 are arranged linearly and symmetrically about longitudinal axis 1 thereby defining the distance between end 14 and end 24. Function display 8 and formulated information display 16 have the smallest area that allows a user holding device 3 to discern the symbols, virtual buttons and virtual function keys being displayed. Depressable trackball 22 has the smallest size that allows a user to completely operate device 3 with one finger. Speaker 12 and microphone 20 have the smallest size that allows a user to use device 3 as a telephone, i.e., a user holding device 3 being able to speak into microphone 20 and listen with speaker 12. Function display 8, formulated information display 16, speaker 12, microphone 20 and depressable trackball 22 have appropriate sizes in that any further decrease in their sizes would make device 3 difficult to use and operate.

Portable device 3 operates in various modes which are shown on function display 8. Function display 8 displays virtual function key 26 which allows the user to enter the "call" mode. Virtual function key 28 allows the user to enter the "electronic message" mode. Virtual function key 30 allows the user to enter the "directory" mode. Virtual function key 32 allows the user to enter the "program mode."

Figure 2:
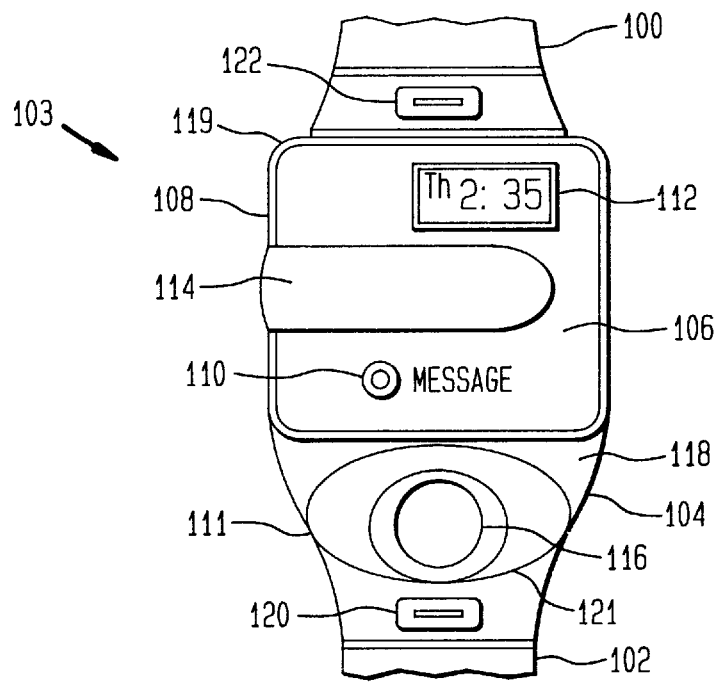
FIG. 2 depicts the present invention as a wearable device with information display closed.
Figure 3:
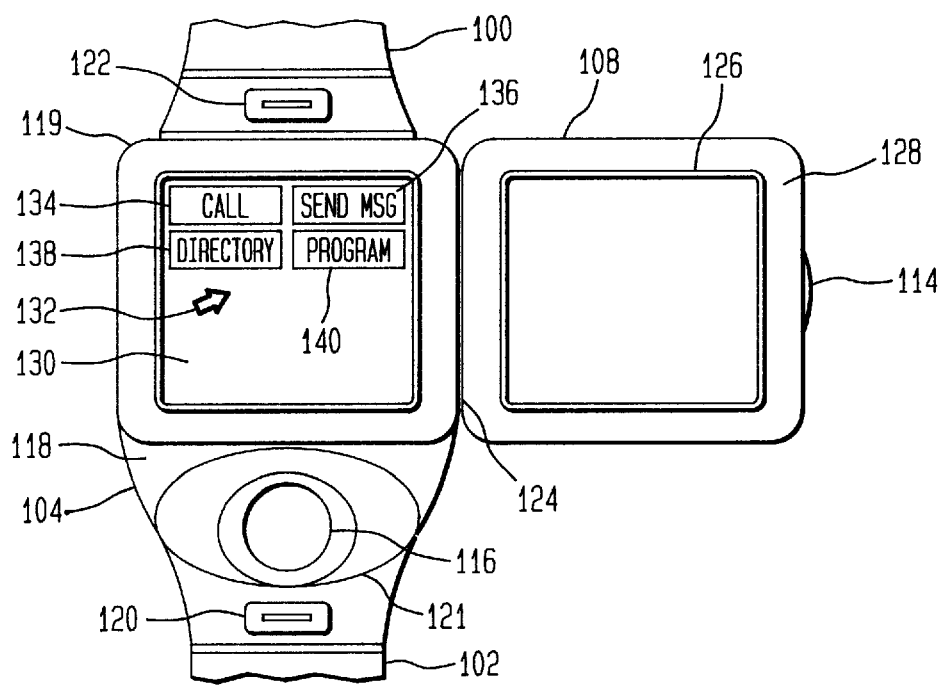
FIG. 3 depicts the wearable device with information display door opened.

FIG. 2 depicts device 103, the second embodiment of the present invention (hereinafter "the wearable device") which shows appendages 100 and 102 connected to respective opposite ends 119 and 121 of base member 104. Appendages 100 and 102 are attachment means for affixing device 103 to a user. Attached to back surface 106 of door 108 are incoming message indicator 110, display 112 and finger catch 114. Finger catch 114 allows the user to open and close door 108 and detachably connects door 108 to base member 104. The wearable device can be used as a wristwatch where display 112 displays the time and date. The manipulatable member is depressable trackball 116 supported by inner surface 118 of base member 104. Microphone 120 is mounted on appendage 102. Speaker 122 is mounted on appendage 100. Speaker 122 and microphone 120 can also be mounted onto base member 104. FIG. 3 depicts the device when the user opens door 108 with the use of finger catch 114. Door 108 is hingedly connected to base member 104 with hinge 124. Formulated information Display 126 is mounted front surface 128 of door 108. Function display 130 is mounted to inner surface 118 of base member 104. Depressable trackball 116 maneuvers location indicator 132 displayed on function display 130 and can be depressed by the user to activate a virtual function key or button being displayed on function display 130. Regarding the sizes of the elements of the wearable device 103, function display 130 and formulated information display 126 have the smallest size that allows the user to discern the symbols, virtual keys and buttons appearing at both displays. Depressable trackball 116 has the smallest size that allows the user to completely operate the device with one finger. Speaker 122 and microphone 120 have sizes that are limited by the size of appendages 100 and 102.

Function display 130 displays virtual function key 134 which allows the user to enter the "call" mode. Virtual function key 136 allows the user to enter the "electronic message" mode. Virtual function key 138 allows the user to enter the "directory mode" and virtual function key 140 allows the user to enter the "program" mode. Portable device 3 and wearable device 103 operate in these various modes which are discussed below. Although both embodiments disclose a depressable trackball as a manipulatable member, the claimed invention is not limited to this type of manipulatable member. The manipulatable member can be a joystick that is easily manipulated with one finger by the user and retracts to a center position when released by the user. As with the depressable trackball, the joystick can be depressed to alter information being displayed. Another type of manipulatable member is shown in FIG. 12.

Figure 12:
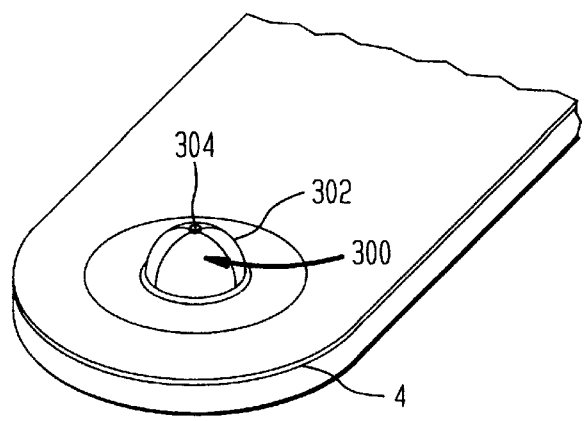
FIG. 12 depicts the base member of the portable supporting an ergonomic joystick.

FIG. 12 depicts ergonomic joystick 300 being supported by base member 4. Ergonomic joystick 300 has dome member 302 and friction bump 304 to facilitate manipulation by the user. Ergonomic joystick 300 is easily manipulated by a user to alter information being displayed and retracts to a center position when released by the user. Friction bump 304 allows easy manipulation of ergonomic joystick 300 as it substantially eliminates the need by the user to use more than one finger to operate ergonomic joystick 300. Also, dome member 302 provides a reactive force to the user's finger forcing the user to apply the proper force when manipulating ergonomic joystick 300. As with the depressable trackball, ergonomic joystick 300 is depressable and thus when depressed causes displayed information to be altered. Any manipulatable member such as those described above or others that allow a user to operate the device can be used as part of the interface claimed in this invention.

Figure 4:
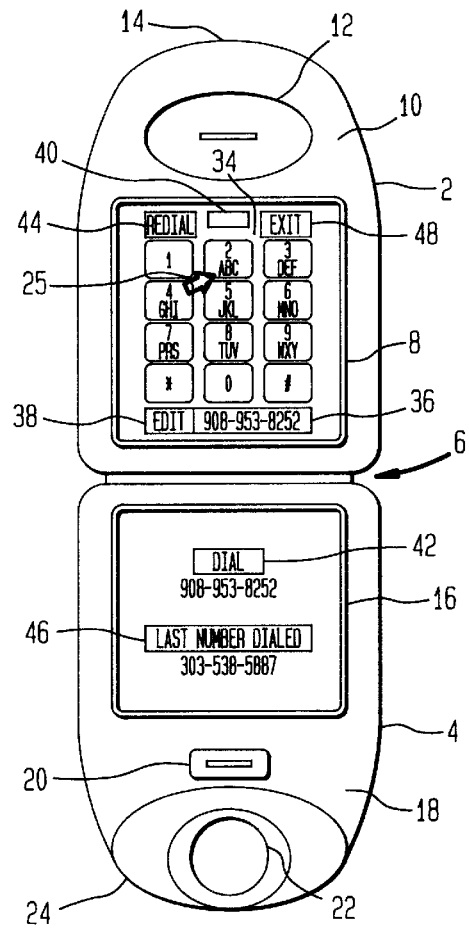
FIG. 4 depicts the portable device in the "call" mode.
Figure 5:
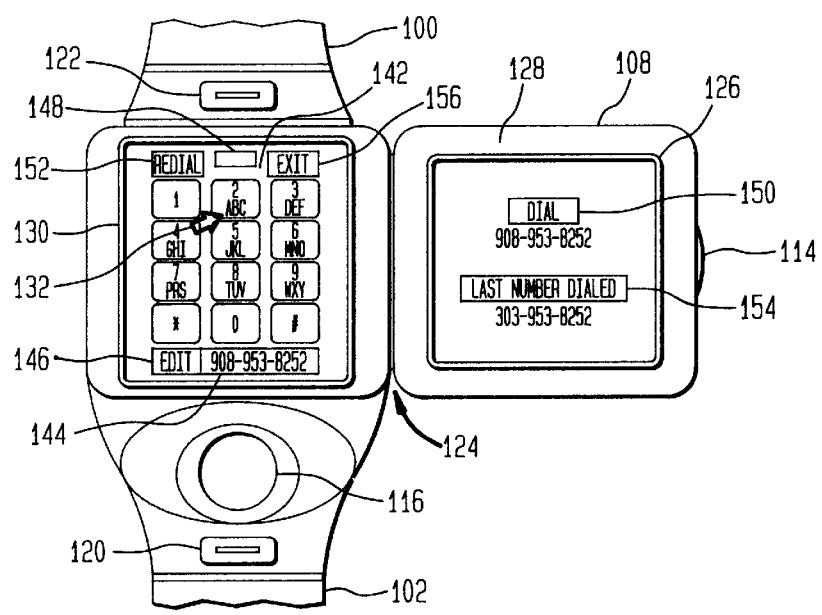
FIG. 5 depicts the wearable device in the "call" mode.

Referring to FIGS. 1 and 3, to enter into the Call mode for portable device 3 (and wearable device 103), the user maneuvers depressable trackball 22 (116) so that location indicator 24 (132) points directly at virtual call function key 26 (134). Depressable trackball 22 (116) is functionally connected to function display 8 (130) and formulated information display 16 (126) with microprocessor means and electronic circuit means (not shown) for controlling and changing symbols on a display. The microprocessor means and electronic circuit means for controlling and changing symbols on a display are well known to those of ordinary skill in the art to which this invention belongs and thus are not discussed herein. The user then depresses depressable trackball 22 (116) activating virtual call function key 26 (134). The devices enter into the call mode as shown in FIGS. 4 and 5. In the call mode, the user can operate a virtual keypad 34 (142) displayed at function display 8 (126) to make a call. In the example shown, the user maneuvers depressable trackball 22 (116) to point to a virtual button of keypad 34 (142) with location indicator 25 (132) and selects that number by depressing depressable trackball 22 (116). Each number selected by the user appears at display field 36 (144). The user can edit any number appearing at display field 36 (144) by first selecting virtual edit function key 38 (146) and then highlighting a number in display field 36 (144) that is to be edited. The next number selected from keypad 34 (142) replaces the highlighted number. The user selects edit function key 38 (146) by first pointing to it with location indicator 25 (132) and then depressing depressable trackball 22 (116). Each number appearing at display field 36 (144) is highlighted in the same manner, i.e., the user points to the number with location indicator 25 (132) and then highlights the number by depressing depressable trackball 22 (116). Once the user is ready to dial the number, the user selects dial function key 40 (148). The number being dialed then appears on formulated information display 16

(126) underneath display field 42 (150). Redial key 44 (152) allows the user to redial the last number dialed which appears underneath display field 46 (154) of formulated information display 16 (126). The user exits from the Call mode by selecting exit key 48 (156) which returns the devices to the idle mode as shown in FIGS. 1 and 3. Function display 8 (130) and formulated information display 16 (126) are LCD displays.

Figure 6:
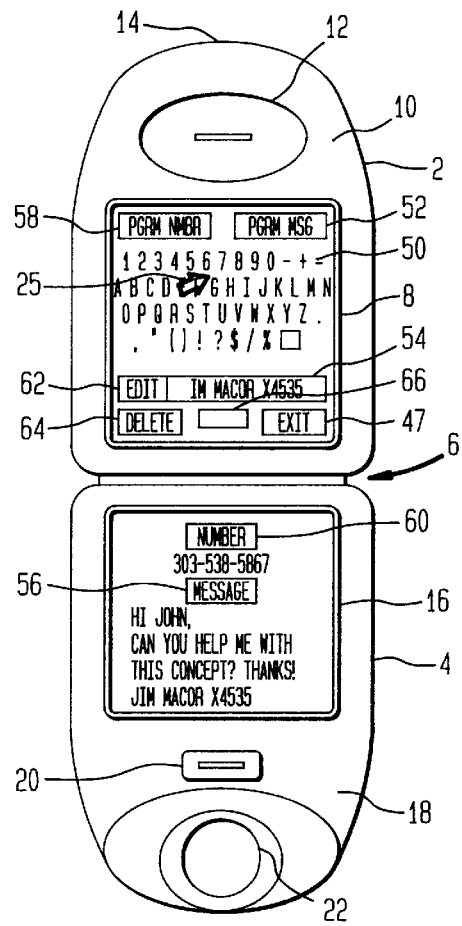
FIG. 6 depicts the portable device in the "electronic message" mode.
Figure 7:
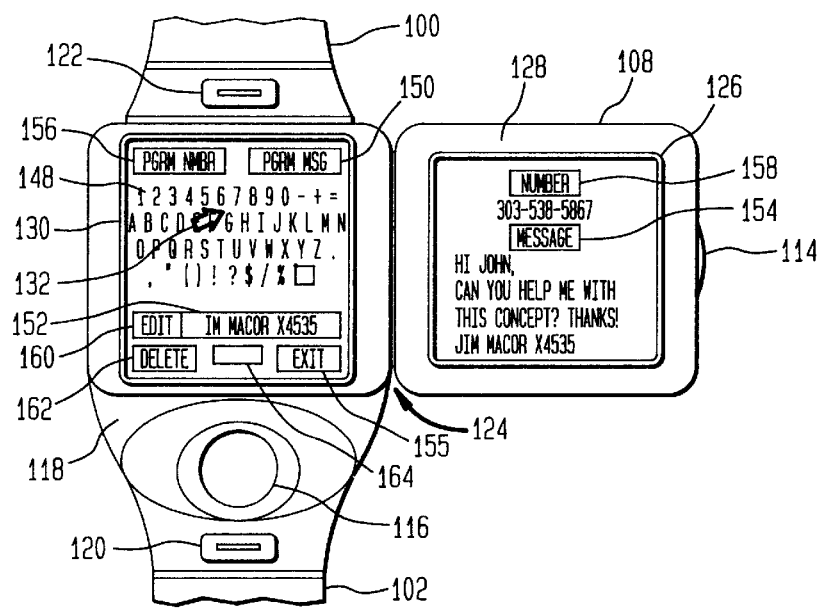
FIG. 7 depicts the wearable device in the "electronic message" mode.

Referring to FIGS. 1 and 3, to enter into the Electronic Message mode from the idle mode, the user activates Send Msg function key 28 (136). FIGS. 6 and 7 show the devices in the electronic message mode. The user formulates a message with the use of virtual keyboard 50 (148). Virtual keyboard 50(148) may contain any type of symbol set where each virtual key represents at least one symbol. First, the user highlights Program Message key 52 (150) and then selects the proper alphanumeric keys from virtual keyboard 50 (148) to form a message. The message being formulated appears in edit display field 54 (152) and in formulated information display 16 (126) underneath display field 56(154). The user then highlights Program Number key 58 (156) to enter the telephone number to which the message is being sent. The user formulates the phone number by selecting the pertinent numbers from virtual keyboard 50 (148). The formulated telephone number appears in edit display field 54(152) and in formulated information display 16 (126) underneath display field 60(158). While entering the message or telephone number, the user can edit the entered information by first highlighting edit function key 62 (160) and then highlighting a character appearing in edit display field 54 (152). If the user wants to delete the highlighted character, the user simply activates delete function key 64 (162). If the user wants to insert a character, the user simply selects that character from keyboard 50 (148) causing the character to be inserted immediately after the highlighted character. The user can also scroll through the entered text message or telephone number to display that part of the message or telephone number that needs to be edited. The user does this by selecting edit function key 62 (160) and holding down depressable trackball 22 (116) causing the message or telephone number to scroll across edit display field 54 (152) and stops scrolling the message or phone number when the portion of text that needs to be edited is being displayed by edit display field 54 (152). The user stops the scrolling by simply releasing depressable trackball 22 (116). Once the user is satisfied with the accuracy of the message and telephone number, the user activates transmit function key 66 (164) causing the device to dial the displayed number and transmit the text displayed on formulated information display 16 (126). The user exits from the Electronic Message mode by selecting exit key 47 (155) which returns the device to the idle mode as shown in FIGS. 1 and 3.

Figure 8:
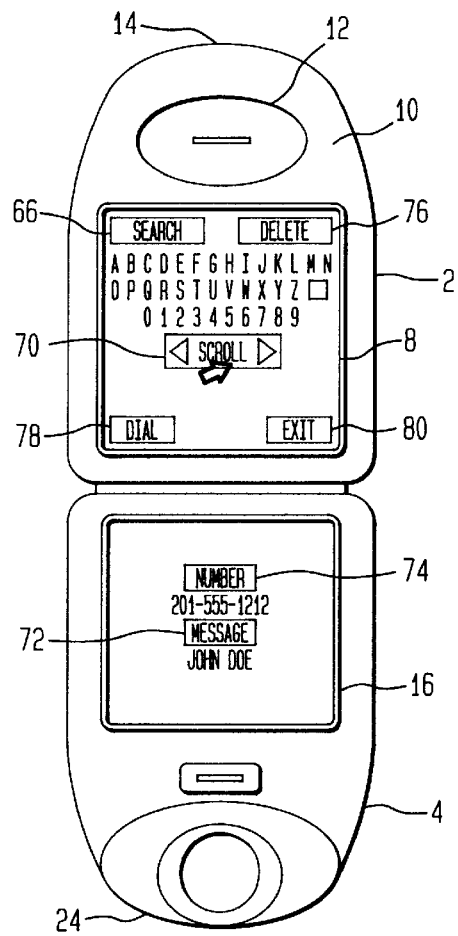
FIG. 8 depicts the portable device in the "directory" mode.
Figure 9:
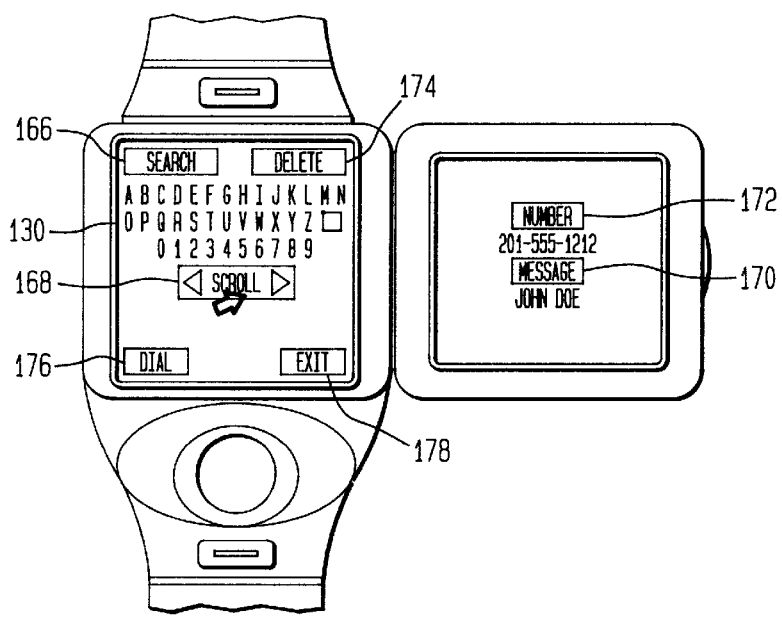
FIG. 9 depicts the wearable device in the "directory" mode.

Referring to FIGS. 1 and 3, to enter into the directory mode from the idle mode, the user activates directory function key 30 (138) causing the devices to appear as shown in FIGS. 8 and 9. The user can search for a stored name and accompanying telephone number by first activating search function key 66 (166) and then scroll forward or backward through the list by activating scroll key 70 (168 ) causing the stored names to appear underneath name display field 72 (170) and the telephone numbers to appear underneath number display 74 (172). The user can also search for a name by first activating search key 66 (166) and then entering the name by selecting the proper symbols from function display 8 (130) causing the name to appear underneath name display field 72 (170). If the name is stored, the accompanying telephone number is displayed underneath display field 74 (172) on formulated information display 16 (126). The user can store a name and number by selecting the alphanumeric characters displayed on function display 8 (130). The user can delete a stored name and accompanying number by activating delete function key 76 (174) while the name and number are being displayed. The user can dial the displayed number by activating dial function key 78 (176). The user can exit from the directory mode and return to the idle mode by activating exit function key 80 (178).

Figure 10:
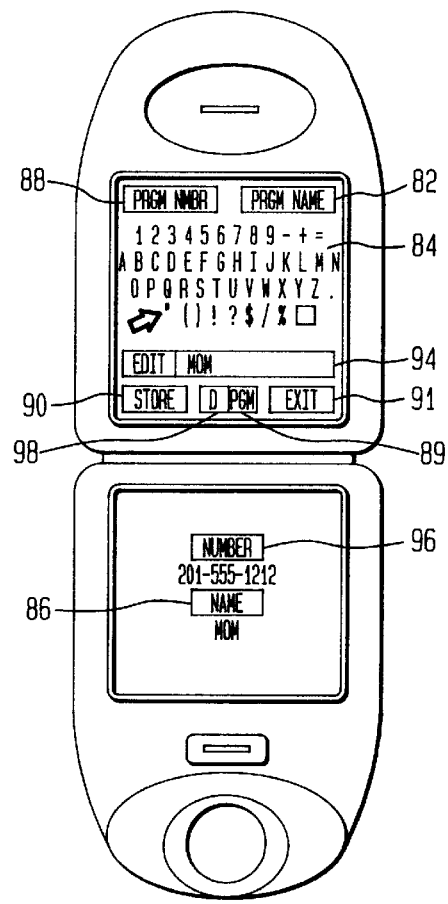
FIG. 10 depicts the portable device in the "program" mode.
Figure 11:
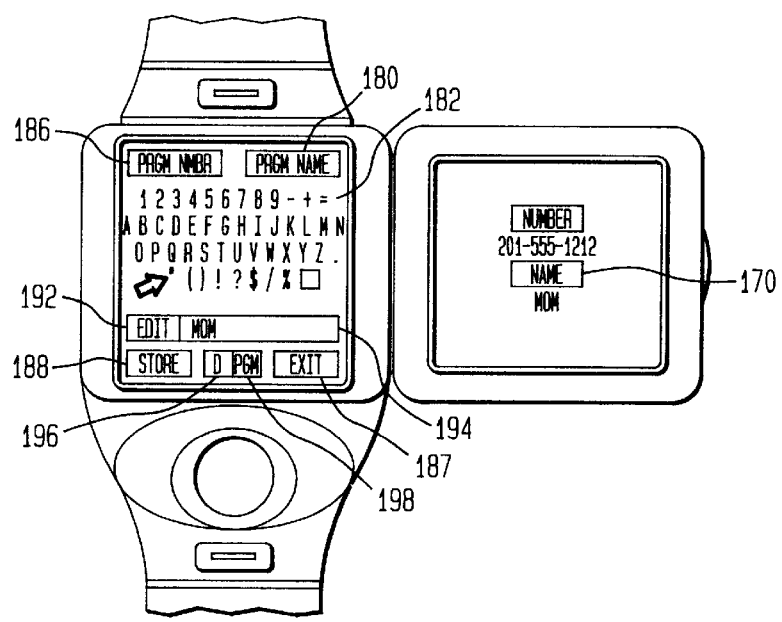

Referring to FIGS. 1 and 3, to enter the program mode from the idle mode, the user activates program function key 32 (140) causing the devices to appear as shown in FIGS. 10 and 11. The user can program a name and a corresponding number and then assign a program name to the stored information. For example, a user first activates Program Name key 82 (180) and then formulates a name from keyboard 84 (182) with the name appearing underneath name field display 86 (184) and within edit field display 94 (192). The user then programs a telephone number by activating Program Number function key 88 (186) and selecting the numbers from keyboard 84 (182). The selected telephone number appears underneath number field display 96 (194) and in edit field display 94 (192). The user then stores the name and telephone number by activating store function key 90 (188). The user can edit the stored name and telephone number by first activating edit function key 92 (190). The user then highlights the letter or number to be deleted within edit field display 94 (192) and then selects delete key 98 (196) causing the highlighted alphanumeric character to be deleted. To insert a character, the user highlights the character within edit field display 94 (192) after which the new character is to be inserted. The user then simply selects the new character from keyboard 84 (182) which appears immediately after the highlighted character in edit display field 94 (192) and appears underneath name display field 86 (184) or number display field 96 (194). The user can store the name of the program by activating PGM key 89 (198) and then enters the name of the program in edit field 94 (192) using keyboard 84 (192). The user can exit the program mode by activating exit key 91 (187). Referring to FIGS. 1 and 3, the name of the programs stored by the user can be displayed on function screen 8 (130) by the user activating program key 32 (140) and then activating PGM key 89 (198) shown in FIGS. 10 and 11. Each program name can be activated in the same manner as a function key and when is so activated will cause the device to dial the telephone number associated with the program. This feature is commonly referred to as a speed dial feature.

The user interface also includes means for alerting the user of an incoming telephone call or an incoming message. Such means for alerting the user is well known in the art to which this invention belongs. The interface may use vibrating means for alerting the user where the entire device (portable or wearable) vibrates. Another means for alerting the user may be a blinking light or LED (light emitting diode) attached to the outer surfaces 7 and 17 (not shown) of first base member and second base member 4 respectively of portable device 3, the back surface of the door 108 of wearable device 103 such as LED 110 in FIG. 2 or to outer surface 111 (not shown) of wearable device 103.

The user interface described above interacts with a telephony or electronic messaging device having signal transmission and reception means for communicating voice, data and other information. These devices also have memory means for storing information and microprocessor means for allowing the manipulatable member to select data from the display menus, activate function keys to create information on one of the displays and cause that information to be displayed on another display. The electronic circuit and microprocessor means that allow the manipulatable member to be functionally connected to the displays as described above or to operate the displays as well as the electronics associated with the transmission means, reception means and memory means are readily known by those of ordinary skill in the art to which this invention pertains and thus, are not discussed herein.

I claim:

1. An ergonomic user interface system for a personal telecommunication device comprising:
   a first base member having an inner surface, an outer surface, a first end and a first hinged end opposite the first end;
   a second base member having an inner surface, an outer surface, a second end and a second hinged end opposite the second end;
   a first display mounted on the inner surface of the first base member for displaying information;
   a second display mounted on the inner surface of the second base member for displaying information;
   a microphone supported by one of the first and second base members;
   a speaker supported by one of the first and second base members;
   a hinge connecting the first hinged end to the second hinged ends; and
   a manipulatable member supported by one of the first and second base members and functionally connected to at least one of the displays to alter an appearance of displayed information on at least one of the first and second displays in response to a manipulation of the manipulatable member thereby allowing the user to completely operate the telecommunication device.

2. The user interface of claim 1 wherein the speaker, the first display, the second display, the microphone and the manipulatable member are arranged linearly along a longitudinal axis extending between the ends of the base member.

3. The user interface of claim 1 wherein the first display is a function display that displays data menus and virtual function keys and the second display is a formulated information display that displays information formulated using the function display.

4. The user interface of claim 1 wherein the first display is an LCD display.

5. The user interface of claim 1 wherein the second display is an LCD display.

6. The user interface of claim 1 wherein the manipulatable member is a depressable trackball.

7. The user interface of claim 1 wherein the manipulatable member maneuvers an indicator appearing on at least one of the displays.

8. The user interface of claim 3 wherein the data menu is a virtual telephone keypad and the manipulatable member selects data from the virtual telephone keypad to formulate a telephone number.

9. The user interface of claim 3 wherein the data menu is a virtual keyboard having a plurality of virtual keys where each virtual key represents at least one symbol and the manipulatable member selects data from the virtual keyboard to display information.

10. The user interface of claim 9 wherein the manipulatable member selectively activates the virtual function keys to command the telecommunication device to transmit the displayed information.

11. The user interface of claim 9 comprising an incoming message indicator means for indicating the presence of an incoming message.

12. The user interface of claim 7 comprising an incoming telephone call indicator means for indicating the presence of an incoming telephone call.

13. The user interface of claim 8 wherein the manipulatable member selectively activates the virtual function keys to cause the telephone number to be displayed on the formulated information display and to initiate operation of the telecommunication device as a telephony device using the displayed telephone number.

14. An ergonomic user interface system for a personal telecommunication device affixed to a user, the user interface system comprising:
   a base member having an inner surface, an outer surface and two opposite ends;
   attachment means for attaching the device to the user, the attachment means being connected to the opposite ends of the base member;
   a speaker mounted on the attachment means;
   a microphone mounted on the attachment means;
   a first display mounted on the inner surface of the base member for displaying information;
   a door hingedly connected to the base member, the door having a front surface and a back surface;
   a second display mounted on the front surface of the door for displaying information;
   a fastener that detachably secures the door to the base member when the door is in a closed positions; and
   a manipulatable member supported by the base member and functionally connected to at least one of the first and second displays to alter an appearance of displayed information on at least one of the first and second displays in response to a manipulation of the manipulatable member thereby allowing the user to completely operate the personal telecommunication device.

15. The user interface of claim 14 where the manipulatable member is a depressable trackball.

16. The user interface of claim 14 wherein data menus and virtual function keys are displayed on one of the first and second displays.

17. The user interface of claim 15 wherein the depressable trackball maneuvers an indicator appearing on one of the first and second displays.

18. The user interface of claim 16 wherein the data menu is a virtual keyboard having a plurality of virtual keys where each virtual key represents at least one symbol and the manipulatable member selects data from the virtual keyboard to display information.

19. The user interface of claim 18 wherein the manipulatable member selectively activates the virtual function keys to command the telecommunication device to transmit the displayed information.

20. The user interface of claim 19 comprising an incoming message indicator means for indicating the presence of an incoming message.

21. The user interface of claim 16 where the manipulatable member selects data from the data menus to formulate information one of the first and second displays.

22. The user interface of claim 21 wherein the manipulatable member selectively activates the function keys to cause the information displayed on one of the first and second displays to be displayed on the other of the first and second displays.

23. The user interface of claim 16 wherein the data menu is a virtual telephone keypad and the manipulatable member selects data from the virtual keypad to formulate a telephone number on one of the first and second displays.

24. The user interface of claim 23 wherein the manipulatable member selectively activates the virtual function keys to cause the telephone number to be displayed on the formulated information display and to initiate operation of the telecommunication device as a telephony device using the displayed information.

25. The user interface of claim 24 comprising an incoming telephone call indicator means for indicating the presence of an incoming telephone call.

* * * * *